(12) United States Patent
McClellan et al.

(10) Patent No.: US 6,866,354 B2
(45) Date of Patent: Mar. 15, 2005

(54) DISK SHAPE DETERMINING AND LABELING SYSTEM

(75) Inventors: Paul J McClellan, Bend, OR (US); Jeffrey M Valley, Corvallis, OR (US); David Pettigrew, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 87 days.

(21) Appl. No.: 10/422,039

(22) Filed: Apr. 22, 2003

(65) Prior Publication Data

US 2004/0212670 A1 Oct. 28, 2004

(51) Int. Cl.⁷ ................................................ B41J 3/00
(52) U.S. Cl. ................................ 347/4; 347/2; 156/387
(58) Field of Search ..................... 156/387, DIG. 49; 386/124; 347/2, 4, 105, 106, 9

(56) References Cited

U.S. PATENT DOCUMENTS

| | | |
|---|---|---|
| 4,027,217 A | 5/1977 | Harman |
| 4,967,286 A | 10/1990 | Nomula et al. |
| 5,182,741 A | 1/1993 | Maeda et al. |
| 5,398,231 A | 3/1995 | Shin et al. |
| 5,498,509 A | 3/1996 | Shin et al. |
| 5,608,717 A | 3/1997 | Ito et al. |
| 5,608,718 A | 3/1997 | Schiewe |
| 5,627,895 A | 5/1997 | Owaki |
| 5,675,570 A | 10/1997 | Ohira et al. |
| 5,688,173 A | 11/1997 | Kitahara et al. |
| 5,729,533 A | 3/1998 | Marquardt |
| 5,745,457 A | 4/1998 | Hayashi et al. |
| 5,748,607 A | 5/1998 | Ohira et al. |
| 5,751,671 A | 5/1998 | Koike et al. |
| 5,764,430 A | 6/1998 | Ottesen et al. |
| 5,766,495 A | 6/1998 | Parette |
| 5,781,221 A | 7/1998 | Wen et al. |
| 5,846,131 A | 12/1998 | Kitahara |
| 5,875,156 A | 2/1999 | Ito et al. |
| 5,915,858 A | 6/1999 | Wen |
| 5,949,752 A | 9/1999 | Glynn et al. |
| 5,958,651 A | 9/1999 | Van Hoof et al. |
| 5,967,676 A | 10/1999 | Cutler et al. |
| 5,997,976 A | 12/1999 | Mueller et al. |
| 6,019,151 A | 2/2000 | Wen et al. |
| 6,026,066 A | 2/2000 | Maezawa |
| 6,034,930 A | 3/2000 | Kitahara |
| 6,074,031 A | 6/2000 | Kahle |
| 6,102,800 A | 8/2000 | Kitahara et al. |
| 6,104,677 A | 8/2000 | Kirihara et al. |
| 6,124,011 A | 9/2000 | Kern |
| 6,154,240 A * | 11/2000 | Hickman ............... 347/104 |
| 6,160,789 A | 12/2000 | Abraham |
| 6,202,550 B1 | 3/2001 | Lee et al. |
| 6,264,295 B1 | 7/2001 | Bradshaw et al. |
| 6,270,176 B1 | 8/2001 | Kahle |
| 6,295,261 B1 | 9/2001 | Kim |
| 6,317,399 B1 | 11/2001 | Ohtani et al. |
| 6,384,929 B1 | 5/2002 | Miller |
| 6,386,667 B1 | 5/2002 | Cariffe |
| 6,403,191 B1 | 6/2002 | Casagrande |
| 6,440,248 B1 | 8/2002 | Mueller |
| 6,452,883 B2 | 9/2002 | Chan |
| 6,469,969 B2 | 10/2002 | Carson et al. |
| 2002/0191517 A1 | 12/2002 | Honda et al. |

FOREIGN PATENT DOCUMENTS

JP 08327339 * 12/1996 ........... G01B/11/24

* cited by examiner

*Primary Examiner*—Stephen D. Meier
*Assistant Examiner*—Alfred Dudding

(57) ABSTRACT

In one embodiment, a disk shape determining and labeling system includes a first module configured to determine a shape of a non-round disk. A second module determines an orientation of the non-round disk. The labeling system then applies a visible pattern to the disk, wherein the labeling is performed according to the shape and the orientation of the non-round disk.

33 Claims, 8 Drawing Sheets

DISK SHAPE DETERMINING AND LABELING SYSTEM

BACKGROUND

Application of an image to a label surface of a computer disk, such as an optical disk (CD, DVD, etc.) can be accomplished by "burning" the image into a coating of thermally reactive material previously applied to the label surface of the disk. The laser ordinarily used to write or read data to and from the information side of the disk can be used to heat portions of the coating associated with pixels of the image to result in a thermal reaction and creation of the image. The laser is carried by a sled, which is configured to move the laser to each of a number of tracks. By turning the laser on and off, a concentric ring of pixels can be formed in the coating applied to the label area of the disk.

Specialty optical disks, in non-round shapes, are increasingly available. Business card-shaped disks, star-shaped disks, and other novelty shaped disks are becoming increasingly available. Unfortunately, application of an image to a label surface of a non-round optical disk is not possible with current systems.

SUMMARY

In one embodiment, a disk shape determining and labeling system includes a first module configured to determine a shape of a non-round disk. A second module determines an orientation of the non-round disk. The labeling system then applies a visible pattern to the disk, wherein the labeling is performed according to the shape and the orientation of the non-round disk.

BRIEF DESCRIPTION OF THE DRAWINGS

The following detailed description refers to the accompanying figures. In the figures, the left-most digits(s) of a reference number identifies the figure (Fig.) in which the reference number first appears. Moreover, the same reference numbers are used throughout the drawings to reference like features and components.

DETAILED DESCRIPTION

Figure 1:
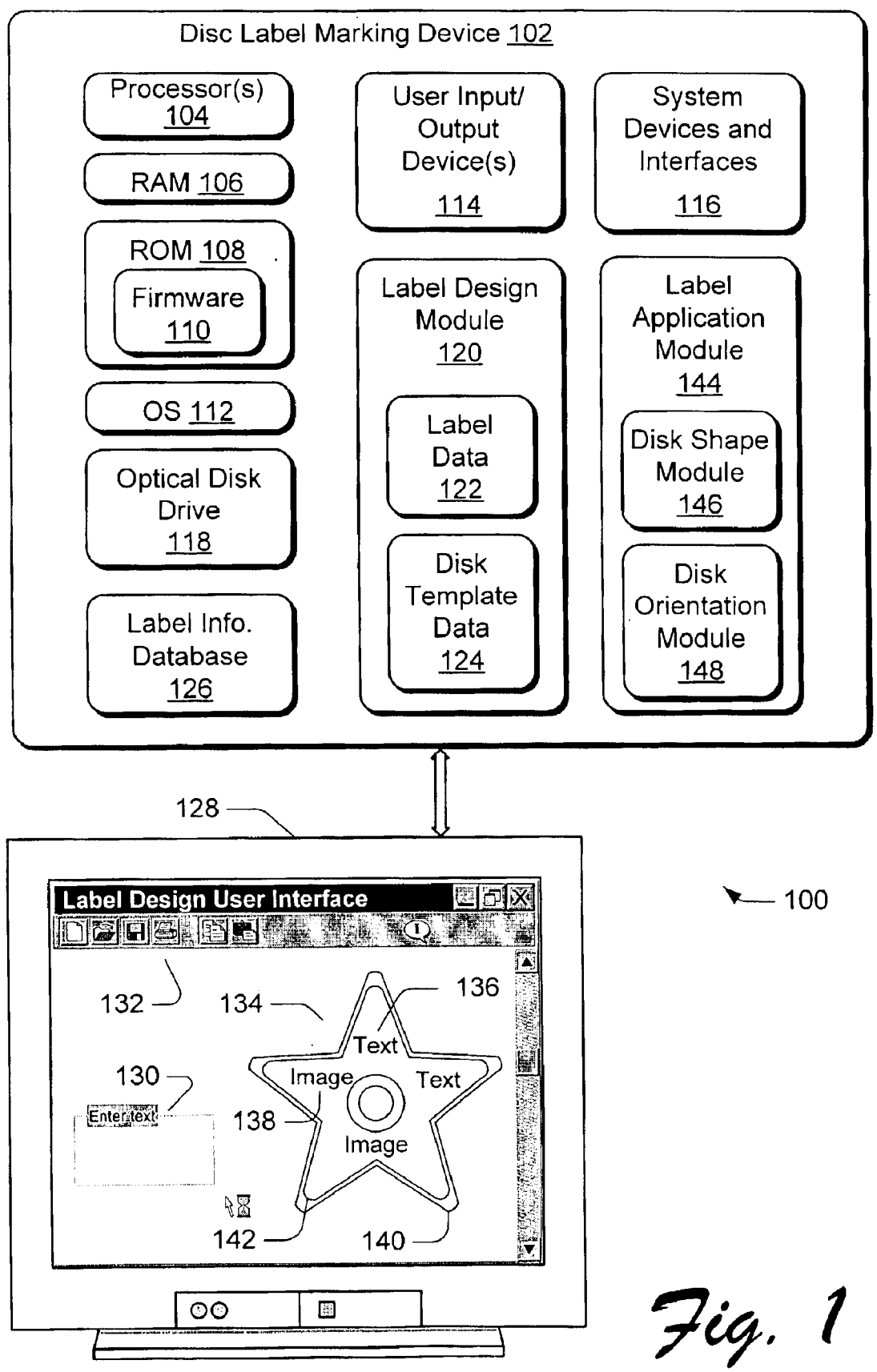
FIG. 1 is a block diagram illustrating an exemplary disk shape determining and labeling system.

FIG. 1 is a block diagram illustrating an exemplary disk shape determining and labeling system 100. A disk label marking device 102 may be a personal computer, workstation or similar computer device, or may be a special-purpose device intended for use in labeling optical or other disks. A typical disk label marking device 102 includes a processor 104, RAM 106 and ROM 108, which may include firmware programming 110. An operating system 112 may provide a run-time environment. User input-output devices 114 such as a keyboard, mouse and monitor are typically included. System devices and interfaces 116 may include a modem or other communications device. An optical disk drive 118 may include a CD, CD-RW, DVD or similar drive.

A label design module 120 may be implemented in software, hardware or firmware and may be configured to enable a user to author or design label data 122. For example, the label data may include pixels data associated with the text and graphics that the user has authored. The label data 122 may be based on a disk template 124, which is associated with the shape of the disk. The disk template 124 makes it easier for the user to author the label data 122, by providing locations into which to text and graphics may be inserted during the authoring process. The disk template 124 may be obtained from any desired location or network, such as the Internet, or from a local repository, such as a label information database 126.

The label design module 120 may include a user interface 128 which supports the user in efficiently authoring label data 122, with or without a disk template 124. The user interface 128 may include regions 130 within which text may be entered, and tools 132 which may be used to obtain graphics. Where template data 124 is provided, an image 134 of that template may be displayed in a manner which allows text or graphics supplied by the user to be automatically located within prescribed area, such as 136, 138. Thus, the image of the template 134 provides an easy manner by which content such as text and graphics may be located manually or automatically within regions on the disk. The template image 134 includes an outline 140 showing the disk shape, and an outline 142 showing a region corresponding to the coated region of the disk onto which images and text may be marked.

A label application module 144 is configured to operate the optical disk drive 118 to apply the label data 122 to the disk. A disk shape module 146 is configured to determine the shape of the disk. For example, the disk shape module 146 may operate lasers and sensors within the optical disk drive 118, to determine the shape of the disk as it rotates. The label design module 120 may then be utilized to author label data 122 appropriate to the shape of the disk. A disk orientation module 148 is configured to determine the orientation of the disk as it spins within the optical disk drive 118. The label application module 144 then marks the disk using the label data 122 as the disk spins in the drive.

Figure 2:
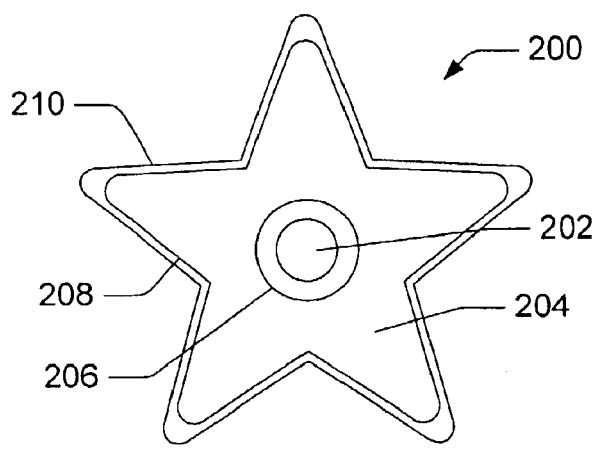
FIG. 2 is an orthographic view of an exemplary non-round optical disk in a star-shaped configuration.
Figure 3:
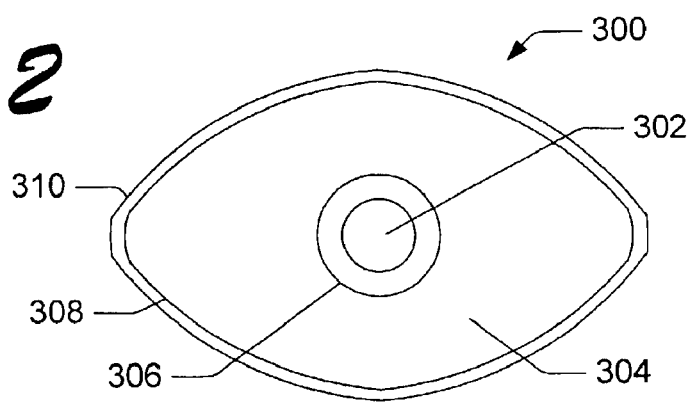
FIG. 3 is an orthographic view of an exemplary non-round optical disk in a football-shaped configuration.
Figure 4:
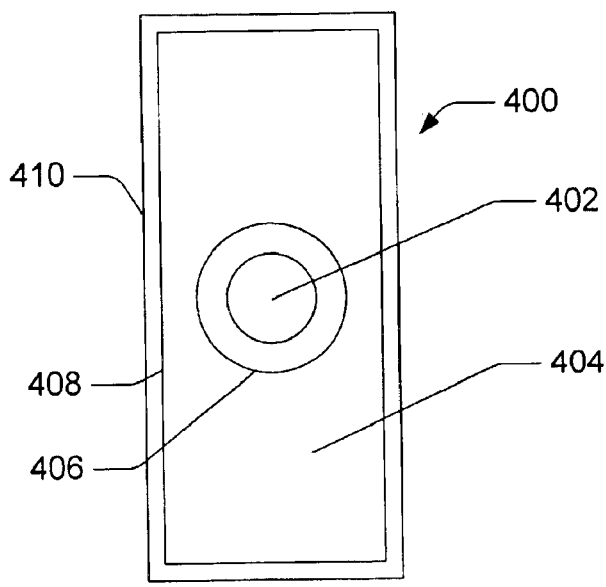
FIG. 4 is an orthographic view of an exemplary non-round optical disk in a business card-shaped configuration.

FIG. 2 is an orthographic view of an exemplary non-round optical disk 200 in a star-shaped configuration. The disk 200 includes a standard-sized centrally-located hole 202, and includes optically readable media on the bottom side (not shown) that is consistent with known CDs, DVDs and other media. A label region 204 extends from an inner boundary 206 to an outer boundary 208 which is contoured incrementally inside the outer edge 210 of the disk 200. Similarly, FIG. 3 is an orthographic view of an exemplary optical disk 300 in a football-shaped configuration, having features 302–310 as described above with respect to features 202–210. And, FIG. 4 is an orthographic view of an exemplary optical disk 400 in a business card-shaped configuration, having features 402–410 as described above with respect to features 202–210.

Figure 5:
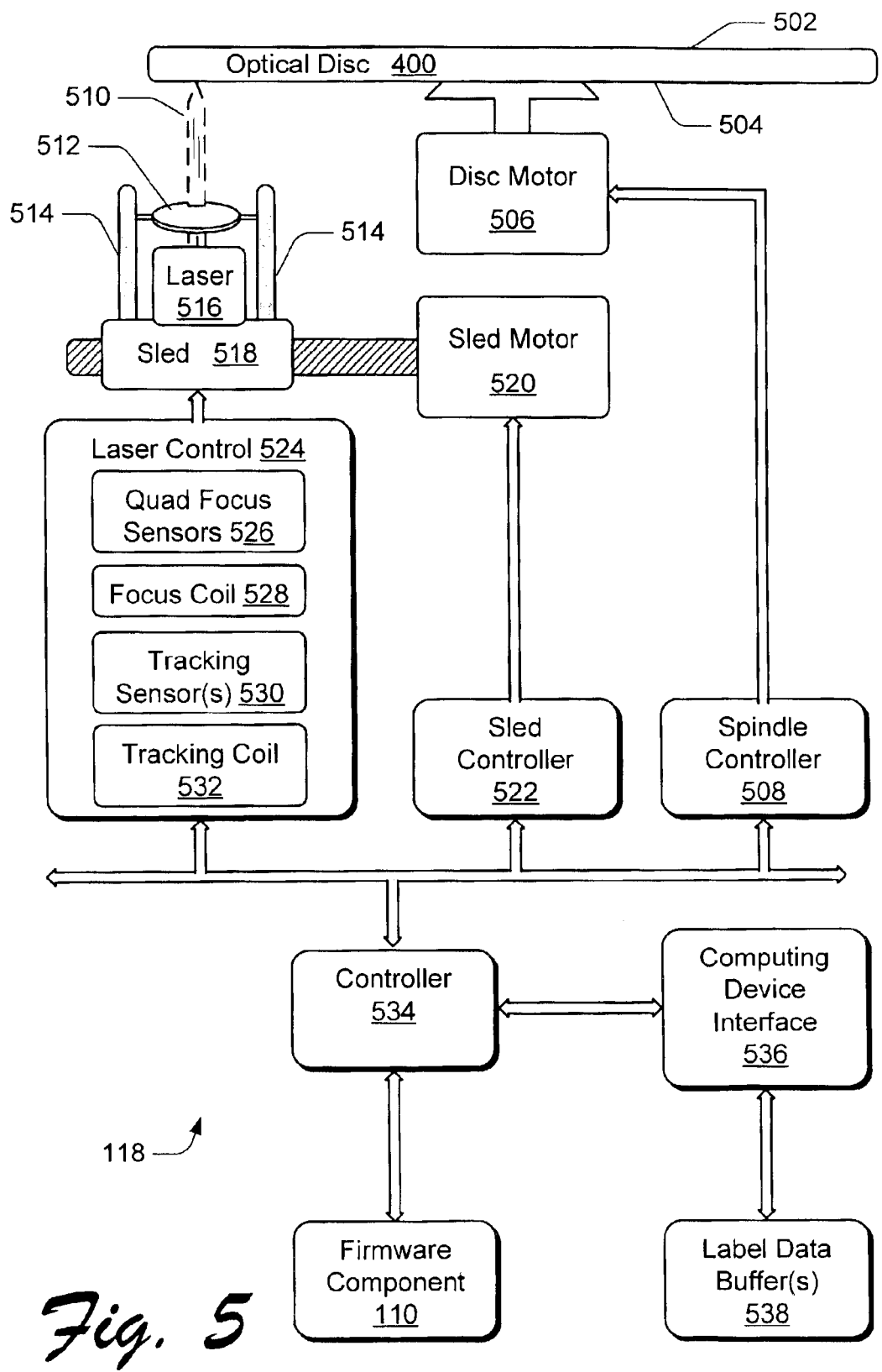
FIG. 5 is a somewhat diagrammatic view showing exemplary detail of the optical disk drive.

FIG. 5 is a somewhat diagrammatic view of the exemplary disk drive and controller system 118 of FIG. 1. A disk 400 having an information side 502 is oriented to position the label side 504 for marking. The disk is rotated by a disk or spindle motor 506, which is controlled by the spindle controller 508. The laser beam 510 strikes the coated surface of the label side 504 of the disk 400 after passing through a lens 512 carried by supports 514. The laser 516 is carried by a sled 518, which is moved in a radial direction (relative to the disk 400) by the sled motor 520. In a typical application, the sled motor 520 advances the sled 518, carrying the laser 516, in incremental steps from the inside edge 206 (FIG. 2) of the label region 204, to the outside edge 208 of the label region 204 under the direction of a sled controller 522; alternatively, the sled may be moved in the opposite direction.

A laser controller 524 is in communication with the laser, and controls the operation of the laser, as well as associated tracking coils and sensors. In the example of FIG. 5, a quad focus sensor 526 typically contains four sensors, and is designed to sense the distance between the laser 516 and the disk 400. A focus coil 528 is designed to cooperate with the quad focus sensor 526, and to move the laser 516 closer to, and further from, the disk 400.

A tracking sensor 530 is designed to provide an indication if the laser 516 is aimed too much either radially inwardly or outwardly. A tracking coil 532 is designed to deflect the laser 516 radially inwardly or outwardly, i.e. to point the laser 516 slightly more toward the center of the disk 400 or slightly more to the outer edge of the disk 400.

A controller 534 may communicate through an interface 536 with the processor 104. Alternatively, the functionality of the controller 534 may be performed by the processor 104. The label data 122 (FIG. 1) may reside in buffer 538, accessible to the controller 534 and interface 536.

Figure 6:
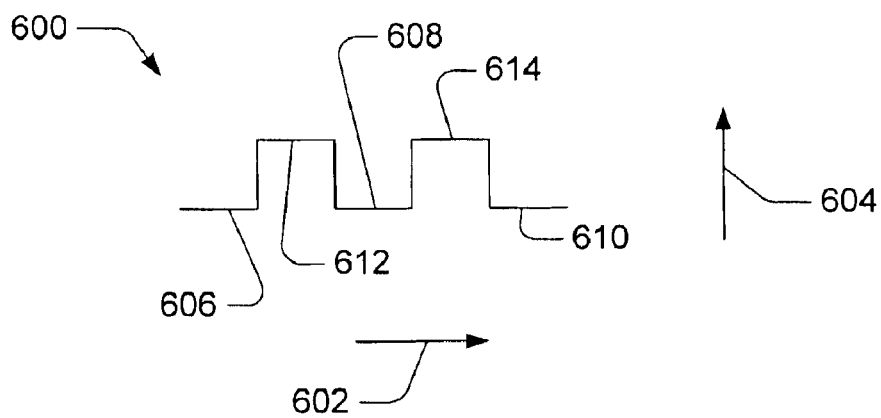
FIG. 6 is an exemplary waveform resulting from a sensor detecting the edge of a spinning disk.

FIG. 6 is an exemplary waveform 600 resulting from a sensor detecting the edge of a spinning disk. Such a waveform may be generated by the operation of the laser 516 and sensor 526, under the control of the disk shape module 146 or the disk orientation module 148. The axis 602 represents elapsed time, while the axis 604 represents the degree to which reflected laser light is detected by an optical sensor. Thus, at 606, 608 and 610, the sensor detects no reflected light, thereby indicating that the shape of the disk is such that no part of the disk is adjacent to the sensor at that time (e.g. the space between the "arms" or "points" of a star, wherein the laser light is not reflected). At locations 612 and 614, reflection from the disk is detected by the sensor, indicating that the shape of the disk is such that a part of the disk is adjacent to the sensor at that time (e.g. the "arms" of the star, which reflect laser light). A plurality of waveforms 600 may be recorded, wherein each waveform corresponds to one of a plurality of positions at which the laser and sensor may be located along a radius of the disk. That is, the laser 516 and sensor 526 may be moved in discrete and incremental steps in a radial direction by the sled 518 (as seen in FIG. 5) along a radial axis, during which a plurality of waveforms, each associated with one of the discrete locations, may be recorded. In the example of FIG. 6, the exemplary waveform illustrated may indicate that the arms of a star shaped disk 200 are passing by the sensor 526. In particular, the portions of the waveform 612, 614 indicate that one of the arms passed by the sensor 526; wherein the portions 606–610 of the waveform indicate that spaces between arms passed by the sensor 526.

Figure 7:
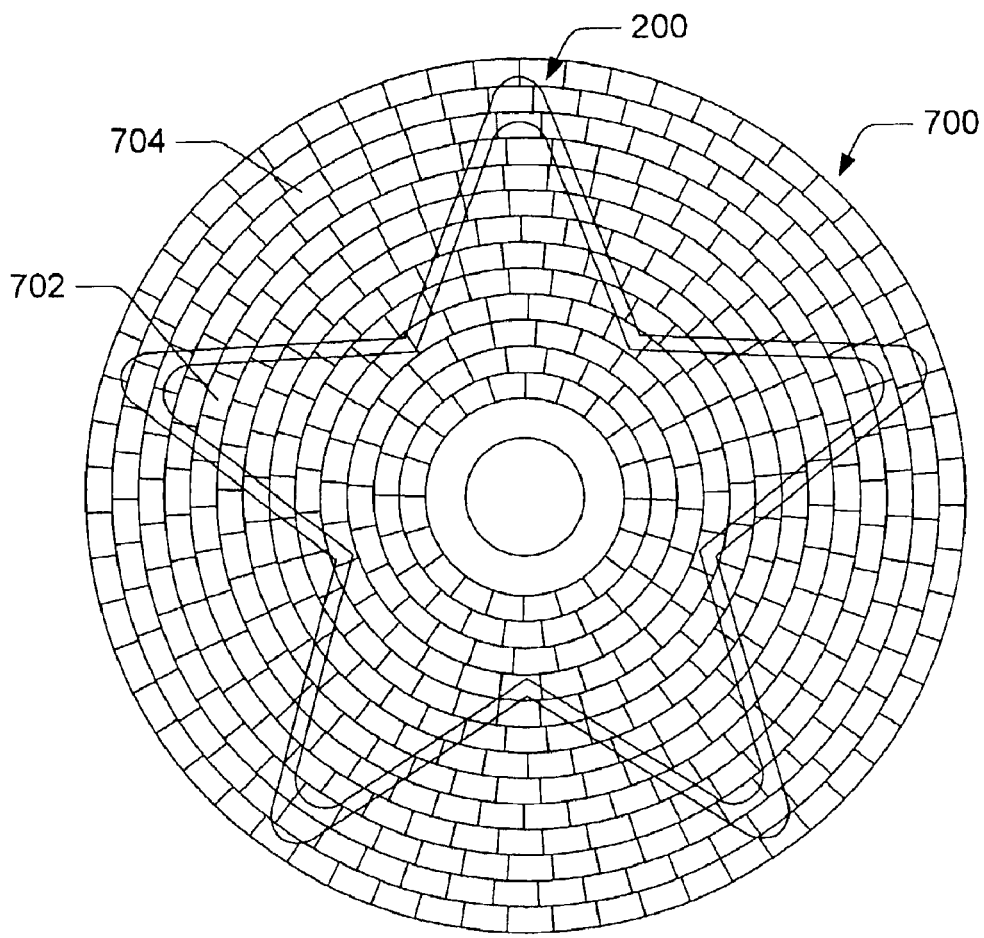
FIG. 7 is an exemplary array of potential pixels, enlarged and not to scale for easier viewing, superimposed on a star-shaped optical disk.

FIG. 7 is an exemplary array of potential pixels 700, enlarged and not to scale for easier viewing, superimposed on a star-shaped optical disk 200. The array of potential pixels 700 includes pixel locations 702 which are located over the region 204 (as seen in FIG. 2) to which the disk labeling system is able to write. The array of potential pixels 700 also includes pixel locations 704 which are located in areas which are not associated with the thermally-reactive coated surface 204. The array 700 may be configured as a data structure, where individual pixels within the array are accessed by use of polar coordinates, or a similar system.

The disk shape module 146 may be configured to utilize the array 700—or an associated data structure—to define the shape of the disk by determining which of the potential pixels of array 700 are available. Data may be obtained for addition to a data structure configured according to the array 700 by "pinging" all of the pixels on the array with the laser 516 and determining which pixel locations reflect light. Pixels associated with regions (such as between the arms of the star 200) which are not present in the non-circular disk would not reflect light. Accordingly, data within the array 700 may be annotated to reflect this. The data within the array would then reflect the shape of the disk.

The label data 122 may be organized according to a data structure based on the array 700. In this application, information about the appearance of each pixel, such as one or more bits of data associated with monochromatic or color information, may be inserted within each pixel location.

Figure 8:
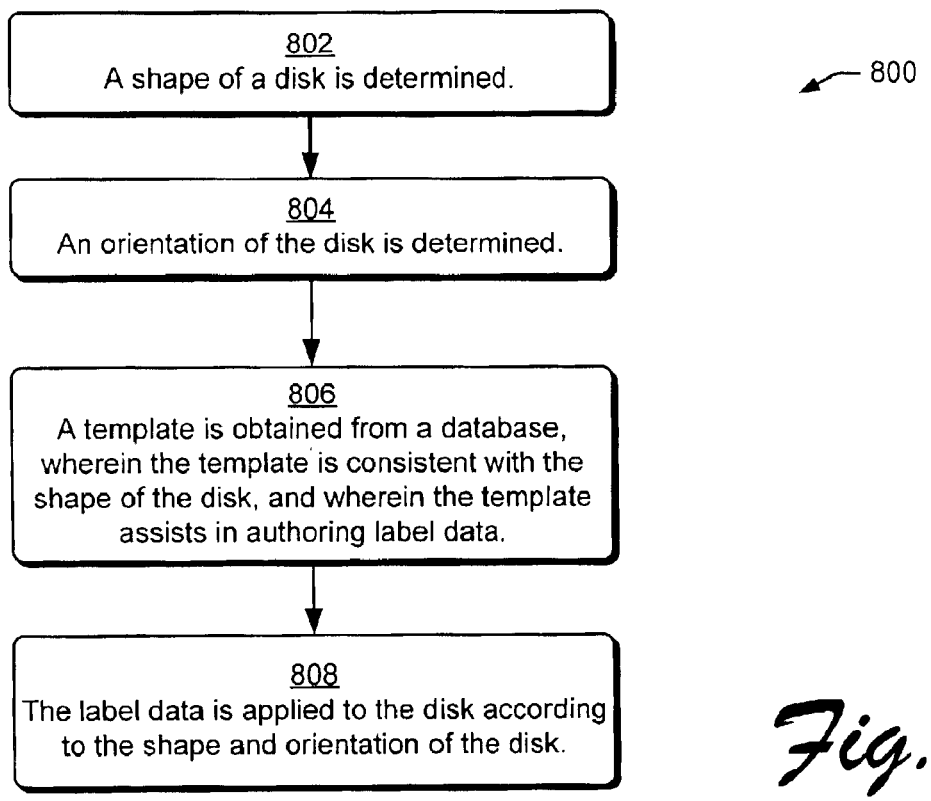
FIG. 8 is a flow diagram that describes operation of an exemplary non-round optical disk labeling system.

FIG. 8 is a flow diagram that describes exemplary operation 800 of a non-round optical disk labeling system. At block 802 a shape of a disk is determined. The shape may be determined by operating a laser 516 and a sensor 526, and by thereby gathering information on the disk shape based on the presence or absence of reflected light. In some applications, the side to which the graphics will be applied is turned away from the laser to prevent marking of the coated region 204 (FIG. 2). In some applications, the laser is applied over such a short period of time or at such a low power level that the laser does not cause reaction of the coating 204 and therefore no marking of the disk.

At block 804, an orientation of the disk may be determined. The orientation may also be determined by use of the laser 516 and sensor 526.

At block 806, template data 124 is selected from a database 126. The template data 126 selected to result in a template image 134 in a user interface 128 which is consistent with the shape of the disk. The template data 124 and image 134 assist the user in the authoring of label data 122 by facilitating the addition of text and graphics into locations indicated by the template, thereby forming label data 122 in a more automated manner.

At block 808, the label data 122, configured in some cases according to the template 124 as seen in block 806, is applied to the disk according to the shape and orientation of the disk. The application may be made to a thermally sensitive coating applied to the disk, or by other technology as desired.

Figure 9:
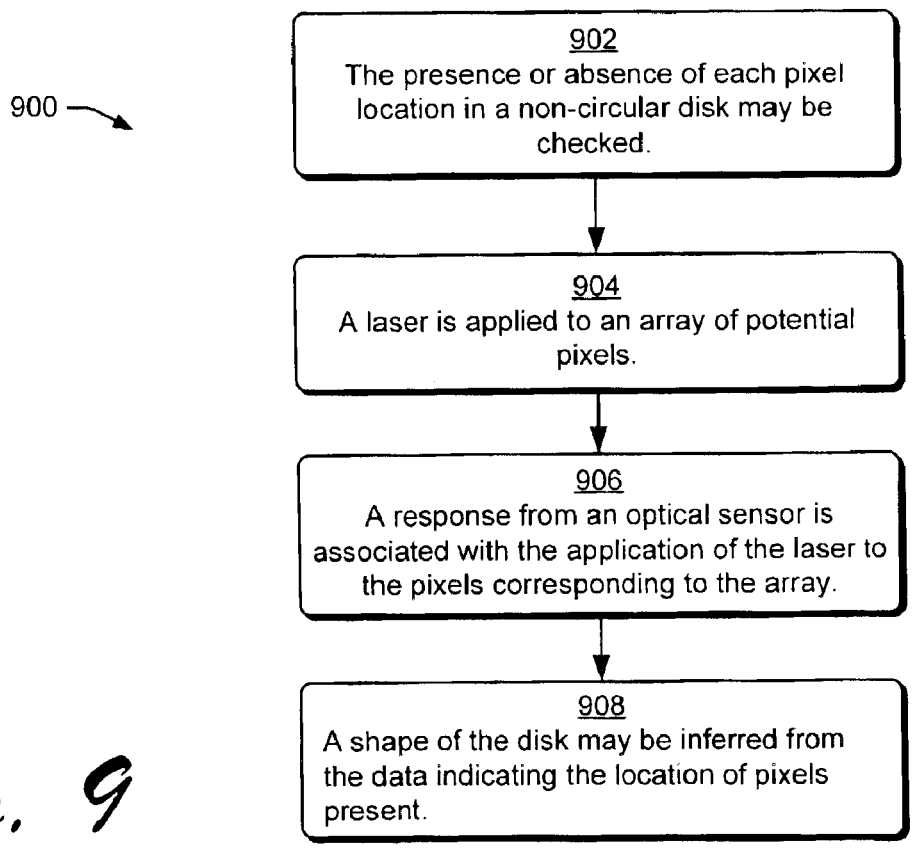
FIG. 9 is a flow diagram that describes a first exemplary method by which the shape of an optical disk may be determined.

FIG. 9 is a flow diagram that describes a first exemplary method 900 by which the shape of a disk may be determined. At block 902, the presence or absence of each pixel location in a non-circular disk may be checked. The checking process may involve "pinging" all, some or a representative sampling of the potential pixel locations by applying a laser to those locations and sensing the reflected result with an optical sensor.

At block 904, a laser is applied to an array of potential pixels. The process by which locations are pinged may involve scanning the disk by moving the laser 516 and sensor 526 on the sled 518 in a radially directed manner, while rotating the disk. The laser is then applied to some or all pixel locations, such as those defined by the array of potential pixel locations 700 of FIG. 7.

At block 906, a response from an optical sensor is associated with the application of the laser to the potential pixel locations. The response may be stored in a data structure corresponding to the array 700, wherein the response indicates the presence or absence of a writeable surface on the disk in the potential pix location. The presence of the potential pixel (see potential pixel location 702 in FIG. 7) or absence of the pixel (see potential pixel location 704 in FIG. 7) results from the shape of the disk.

At block 908, a shape of the disk may be inferred from the data within the data structure corresponding to the array 700. Additionally, where the shape of the disk has been inferred from the data, the shape of the region, (e.g. 204) within which pixels may be marked, can also be inferred.

Figure 10:
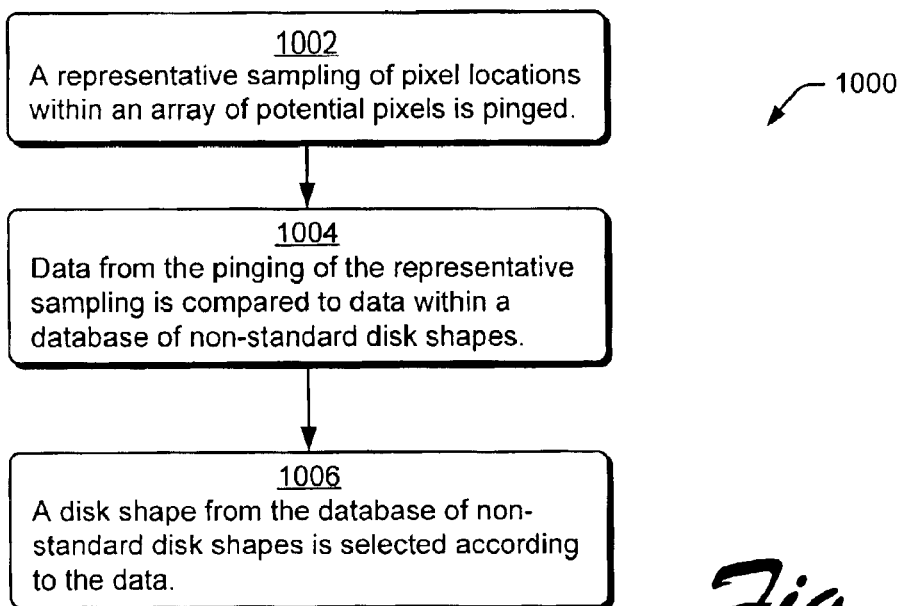
FIG. 10 is a flow diagram that describes a second exemplary method by which the shape of an optical disk may be determined.

FIG. 10 is a flow diagram that describes a second exemplary method 1000 by which the shape of an optical disk may be determined. At block 1002, a representative sampling of pixel locations within an array of potential pixel locations is pinged.

At block 1004, data from the pinging of the representative sampling is compared to data within a database 126 of non-standard disk shapes.

At block 1006, where data within the database 126 of non-standard disk shapes is found to match the data from the pinging of the representative sampling, the shape associate data in the database 126 is associated with the data from the pinging.

Figure 11:
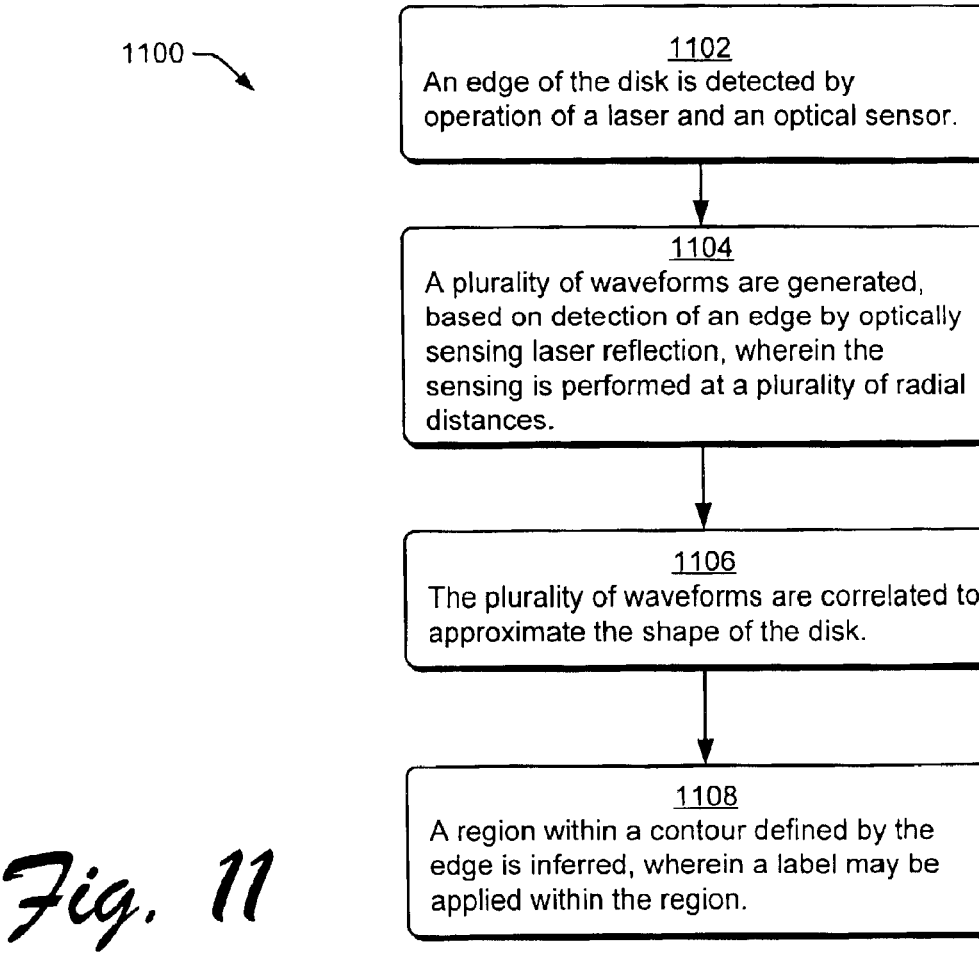
FIG. 11 is a flow diagram that describes a third exemplary method by which the shape of an optical disk may be determined.

FIG. 11 is a flow diagram that describes a third exemplary method 1100 by which the shape of a disk may be determined. At block 1102, an edge of the disk is detected by operation of a laser 516 and an optical sensor 526. In a typical configuration, the edge of the disk is revealed by a change in the output of the optical sensor, wherein detection of reflected laser light indicates presence of the disk, and failure to detect reflected light indicates absence of the disk.

At block 1104, a plurality of waveforms are generated, based on detection of an edge by optically sensing laser reflection. As seen in FIG. 6, the reflected light can be used to generate a waveform 600, which corresponds to the edge of the disk during rotation. The sled 518 may be moved to a plurality of radial distances, thereby resulting in a waveform 600 associated with each radial distance. At block 1106, the plurality of waveforms may be associated or correlated with the circumferential swaths of the disk of corresponding length to approximate the shape of the disk. That is, each waveform associated with a complete revolution of the disk, indicates portions of the disk which do exist (e.g. the arms of the star) and do not exist (e.g. the spaces between the arms of the star) at that radial distance. Knowledge of which portions of the disk do exist and do not exist at different radial distances can be used to describe the shape of the disk. At block 1108, a region within a contour defined by the edge 210 is inferred by application of knowledge of the distance separating the edge 210 of the disk 200 from the edge 208 of the coated surface 204 wherein a label may be applied. Similarly, differences in reflectivity may be used to distinguish the coated surface region from the non-coated surface region.

Figure 12:
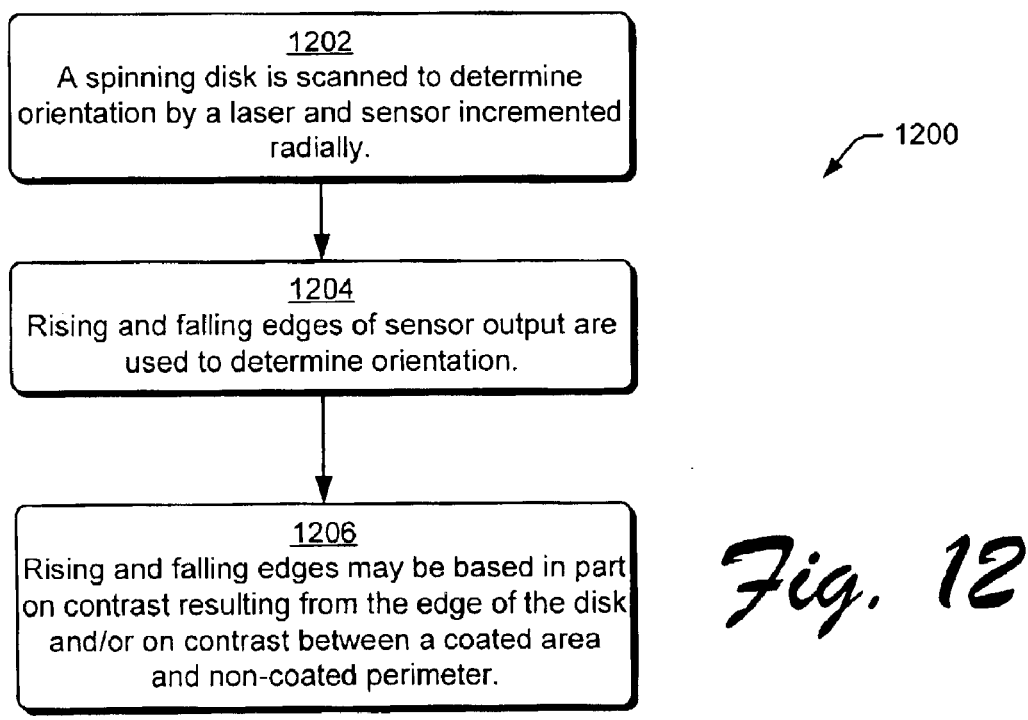
FIG. 12 is a flow diagram that describes an exemplary method by which the orientation of an optical disk may be determined.

FIG. 12 is a flow diagram that describes an exemplary method 1200 by which the orientation of an optical disk may be determined. At block 1202, a spinning disk is scanned by a laser 516 and sensor 526 incremented radially, such as by a sled 518. At block 1204, rising and falling edges of the output of the sensor are used to determine the disk's orientation. At block 1206, the rising and falling edges may be based on contrast resulting from the edge of the disk. Alternatively, the rising and falling edges may be based on the contrast between the coated area 204 and a non-coated perimeter adjacent to the edge 210 of the disk. For example, in some applications, the thermal coating applied to the region 204 upon which an image may be marked has reflective characteristics that are sufficiently different from the perimeter of the disk (e.g. between 208 and 210) that rising and falling edges may be detected.

Figure 13:
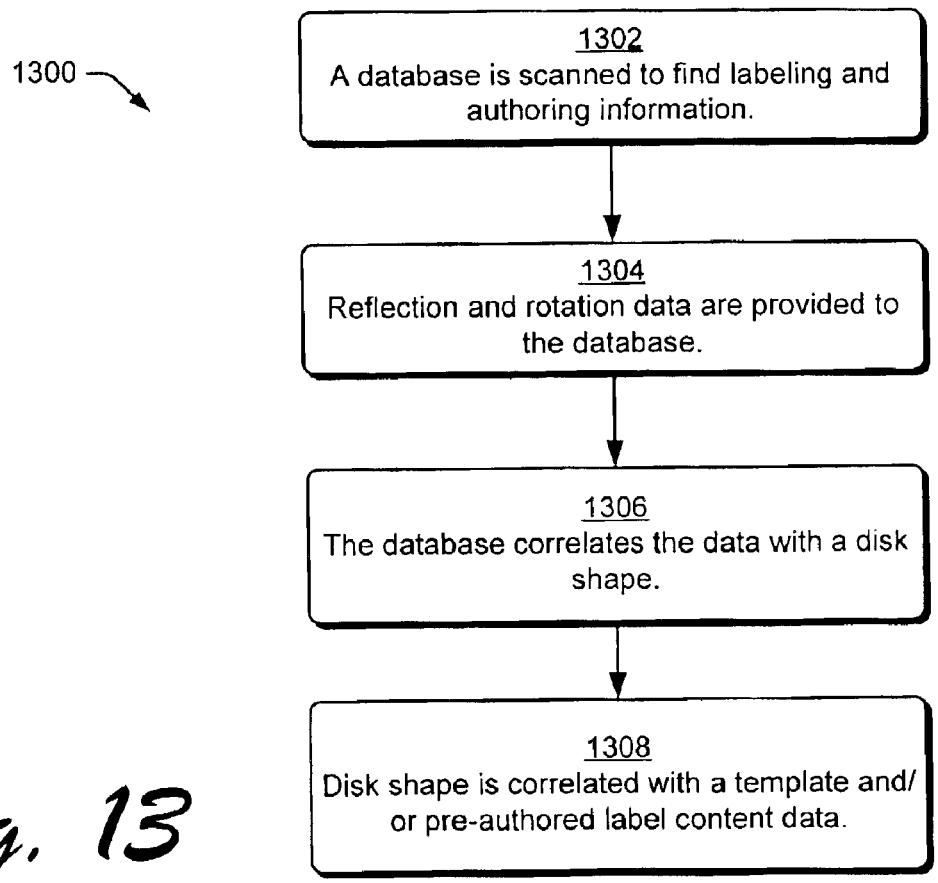
FIG. 13 is a flow diagram that describes an exemplary method by which a database may be operated to provide authoring information.

FIG. 13 is a flow diagram that describes additional detail of an exemplary method 1300 by which a database may be operated to provide templates and disk shape information to assist in authoring label data. At block 1302, a database is scanned to find labeling and authoring information, such disk shape information, label templates and/or pre-authored content.

At block 1304, reflection and rotation data (i.e. optical sensor output resulting from reflection of a laser beam, correlated with information about the rotation of a disk) are matched with information within the database. In a first example, the reflection and rotation data can be in the form of a data structure associated with an array of pixels 700. In a second example, the data may be associated with one or more waveforms 600, wherein each waveform is typically associated with a radial distance at which the sensor was located during the waveform generation.

At block 1306, scanning the database allows matching of the data provided at block 1304 with disk shape information in the database.

At block 1308, in some applications, the disk shape is correlated with a template and/or pre-authored label content data.

Figure 14:
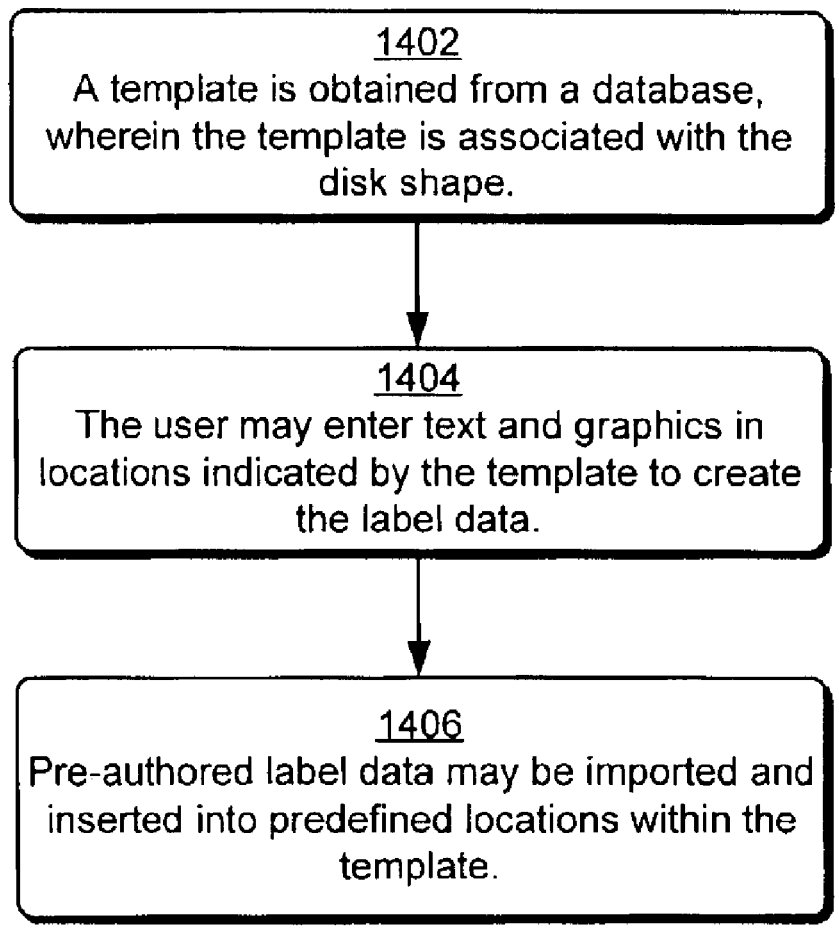
FIG. 14 is a flow diagram that describes an exemplary method by which a template may be used to assist in the label authoring process.

FIG. 14 is a flow diagram that describes an exemplary method 1400 by which a template may be used to assist in the label authoring process. At block 1402, template data 124 is obtained from a database 126, or off a network such as the Internet. The template data 124 is associated with a disk shape, which has been determined.

At block 1404, the template data 124 allows a user interface 128 to display a template image 134, including areas 136, 138 for the insertion of text and graphics. The template reduces the effort required by the user to create the label data 122, and generally speeds the label authoring process.

At block 1406, pre-authored label data may be imported and inserted into predefined locations within the template, further speeding the authoring process. In some applications, pre-authored label data is complete, and does not require use of the template.

Although the disclosure has been described in language specific to structural features and/or methodological steps, it is to be understood that the appended claims are not limited to the specific features or steps described. Rather, the specific features and steps are exemplary forms of implementing this disclosure. For example, while, actions described in blocks of the flow diagrams may be performed in parallel with actions described in other blocks, the actions may occur in an alternate order, or may be distributed in a manner which associates actions with more than one other block.

What is claimed is:

1. A processor-readable medium comprising processor-executable instructions for:

determining an orientation of the disk; and labeling the disk with a visible pattern, wherein the labeling is performed according to the shape and the orientation.

2. A processor-readable medium as recited in claim 1, additionally comprising further instructions for:

obtaining a template from a database, wherein the template is consistent with the shape of the disk; and providing locations within the template into which text and graphics may be entered to create label data.

3. A processor-readable medium as recited in claim 1, wherein the determining the shape comprises further instructions for:

scanning the disk;

recording a response associated the scanning; and analyzing the recording of the response to determine the shape of the disk.

4. A processor-readable medium as recited in claim 1, wherein the determining the shape comprises further instructions for:

applying a laser according to an array of potential pixels;

associating the application of the laser with a response from an optical sensor;

combining the array and the response to determine the shape of the disk.

5. A processor-readable medium as recited in claim 1, wherein the determining the shape comprises further instructions for:

pinging a representative sampling of pixel locations within an array of potential pixels;

matching data from the pinging of the representative sampling to a database of non-standard disk shapes; and selecting a disk shape from the database of non-standard disk shapes according to the data.

6. A processor-readable medium as recited in claim 1, wherein the determining the shape comprises further instructions for:

detecting an edge of the disk; and inferring a region within a contour adjacent to the edge within which a label may be applied.

7. A processor-readable medium as recited in claim 1, wherein the determining the shape comprises further instructions for:

generating a plurality of waveforms, based on detection of an edge by optically sensing laser reflection, wherein the sensing is performed at a plurality of radial distances; and correlating the plurality of waveforms with circumferential swaths with which the waveforms are associated to approximate the shape of the disk.

8. A disk labeling system, comprising:

means for determining a geometrical shape of a disk by obtaining and analyzing reflection data;

means for determining an orientation of the disk using the reflection data; and means for labeling the disk with a visible pattern, wherein the labeling is performed according to the shape and the orientation.

9. A disk labeling system as recited in claim 8, additionally comprising:

means for obtaining a template from a database consistent with the shape of the disk;

means for providing locations into which data may be inserted to author a label according to the template; and means for predefining locations within the template into which pre-authored label data may be imported and inserted.

10. A disk labeling system as recited in claim 8, wherein the means for determining the shape comprises:

means for scanning potential pixel locations on the disk;

means for recording a response associated with the scanning; and means for analyzing the recorded response to determine the shape of the disk.

11. A disk labeling system as recited in claim 8, wherein the means for determining the shape comprises:

means for applying a laser to representative pixels within an array of potential pixels;

means for associating the application of the laser with a response from an optical sensor;

means for recording the response; and means for comparing the recording of the response to a database of dish shape information.

12. A disk labeling system as recited in claim 8, wherein the means for determining the shape comprises:

means for pinging a representative sampling of pixel locations within an array of potential pixels;

means for matching data from the pinging of the representative sampling to a database of non-standard disk shapes; and means for selecting a disk shape from the database of non-standard disk shapes according to the data.

13. A disk labeling system as recited in claim 8, wherein the means for determining the shape comprises:

means for detecting an edge of the disk; and means for inferring a region within a contour defined by the edge within which a label may be applied.

14. A disk labeling system as recited in claim 8, wherein the means for determining the shape comprises:

means for generating a plurality of waveforms associated with a plurality of radial distances, wherein each waveform is based on edge detection by optical sensor readings; and means for using the plurality of waveforms to determine the shape of the disk.

15. A disk labeling system, comprising:

a disk shape module determining a geometrical shape of a disk by optical means;

a disk orientation module to determine an orientation of the disk; and a label application module to apply a visible image to the disk, using the shape and the orientation of the disk.

16. The disk labeling system as recited in claim 15, additionally comprising:

a database of disk shape information configured to allow comparison of the shape with the disk shape information within the database;

wherein the database is configured to allow selection of a template, contained within the database; and a label design module to enabled a user to author a label according to the template.

17. The disk labeling system as recited in claim 15, additionally comprising:

a laser configured to illuminate pixels associated with an array of potential pixels;

an optical sensor to detect the illuminated pixels;

a record of the illuminated pixels detected by the optical sensor; and a database of non-standard disk shapes configured to allow comparison to the record of the illumination detected, and to allow selection of a template associated with the record.

18. The disk labeling system as recited in claim 15, additionally comprising:

a laser and a sensor configured to detect an edge of the disk; and wherein the disk shape module is configured to use the detection of the edge to infer a writeable region on the disk.

19. The disk labeling system as recited in claim 15, wherein the disk shape module comprises:

a waveform generator, wherein a waveform generated is based on edge detection by an optical sensor of laser reflection, and wherein the waveform generator is configured to generate a waveform at each of a plurality of radial distances; and wherein the disk shape module evaluates the waveform at each of the plurality of radial distances to determine the shape of the disk.

20. A method of visibly labeling a non-standard sized disk, comprising:

using reflection data and rotation data to determine a shape of a disk;

determining an orientation of the disk based on the reflection data and the rotation data; and labeling the disk, wherein the labeling is performed according to the shape and the orientation.

21. The method as recited in claim 20, additionally comprising:

comparing the shape to a database of disk shape information;

obtaining a template from the database to match the shape; and authoring a label according to the template.

22. The method as recited in claim 20, wherein the using comprises:

illuminating pixels within an array of potential pixels;

recording response data associated with each array location; and using the response data to determine a writeable label area on the disk.

23. The method as recited in claim 20, wherein the using comprises:

applying a laser to representative pixels within an array of potential pixels;

associating the application of the laser with a response from an optical sensor;

determining which pixels within the array of potential pixels may be written to during labeling; and obtaining a template from a database, wherein the template supports authoring label data consistent with use of the pixels within the array of potential pixels which may be written to during labeling.

24. The method as recited in claim 20, wherein the determining the shape comprises:

detecting an edge of the disk using the reflection data; and inferring a coated writeable a region within a contour defined by the edge.

25. The method as recited in claim 20, wherein the determining the shape comprises:

generating a plurality of waveforms, wherein each of the plurality of waveforms is generated by use of edge detection by an optical sensor of a laser reflection, and wherein the plurality of waveforms corresponds to locating the laser and the optical sensor at a plurality of radial distances; and using the plurality of waveforms to approximate the shape of the disk.

26. The method as recited in claim 20, wherein the determining the shape comprises:

pinging a representative sampling of an array of potential pixels;

matching the representative sampling to information in a database; and obtaining a template from the database.

27. A processor-readable medium comprising processor-executable instructions for:

determining a geometrical shape of a disk using reflected laser light;

producing label data according to the shape using a user interface depicting the shape of the disk;

determining an orientation of the disk using the reflected laser light; and applying the label data to the disk according to the shape and the orientation.

28. A processor-readable medium as recited in claim 27, wherein the determining the shape comprises further instructions for:

identifying pixels within an array of potential pixels according to available and unavailable pixels;

comparing the identified pixels to a database of disk shape information; and obtaining the shape from the database.

29. A processor-readable medium as recited in claim 27, wherein the producing label data comprises further instructions for:

obtaining a template from a database to match the shape; and authoring a label according to the template.

30. A processor-readable medium as recited in claim 27, wherein the determining the shape comprises further instructions for:

illuminating pixels with a laser;

recording data from an optical sensor responding to the illuminated pixels; and matching the recorded data to determine the shape of the disk.

31. A processor-readable medium as recited in claim 27, wherein the determining the shape comprises further instructions for:

detecting an edge of the disk to produce contour data; and using the contour data to determine the shape.

32. A processor-readable medium as recited in claim 27, wherein the determining the shape comprises further instructions for:

generating waveforms based on edge detection; and using the waveforms to determine the shape of the disk.

33. A processor-readable medium as recited in claim 27, wherein the determining the shape comprises further instructions for:

pinging a representative sampling within an array of potential pixels;

matching the representative sampling to information in a database of non-standard disk shapes; and selecting a template to aid in authoring the label data from the database of non-standard disk shapes.

* * * * *

UNITED STATES PATENT AND TRADEMARK OFFICE
CERTIFICATE OF CORRECTION

PATENT NO. : 6,866,354 B2
DATED : March 15, 2005
INVENTOR(S) : Paul J. McClellan et al.

It is certified that error appears in the above-identified patent and that said Letters Patent is hereby corrected as shown below:

Column 7,
Line 14, after "instructions for:" insert -- determining a geometrical shape of a disk by optical means --.

Signed and Sealed this

Seventh Day of February, 2006

JON W. DUDAS
*Director of the United States Patent and Trademark Office*